United States Patent [19]
Ohsumi

[11] Patent Number: 5,788,280
[45] Date of Patent: Aug. 4, 1998

[54] SEAT BELT SYSTEM

[75] Inventor: Sadanori Ohsumi, Kanagawa, Japan

[73] Assignee: NSK Ltd., Tokyo, Japan

[21] Appl. No.: 793,597

[22] PCT Filed: Jul. 2, 1996

[86] PCT No.: PCT/JP96/01835

§ 371 Date: Mar. 3, 1997

§ 102(e) Date: Mar. 3, 1997

[87] PCT Pub. No.: WO97/02164

PCT Pub. Date: Jan. 23, 1997

[30]   Foreign Application Priority Data

Jul. 3, 1995   [JP]   Japan .................... 7-187675

[51] Int. Cl.$^6$ .................................................. B60R 22/28
[52] U.S. Cl. ................................... 280/805; 297/471
[58] Field of Search ........................... 280/805, 801.1, 280/808; 297/470, 471, 472, 468

[56]   References Cited

U.S. PATENT DOCUMENTS

| | | | |
|---|---|---|---|
| 5,154,368 | 10/1992 | Fujimura et al. | 297/472 X |
| 5,529,343 | 6/1996 | Klink | 280/805 |
| 5,544,918 | 8/1996 | Fleming et al. | 280/805 |
| 5,547,223 | 8/1996 | Koketsu et al. | 280/805 |
| 5,658,012 | 8/1997 | Villarreal et al. | 280/805 |

FOREIGN PATENT DOCUMENTS 2626159   12/1977   Germany .................... 297/471

*Primary Examiner*—Christopher P. Ellis
*Attorney, Agent, or Firm*—Sughrue, Mion, Zinn, Macpeak & Seas, PLLC

[57]   ABSTRACT

The present invention provides a seat belt system in which it is unnecessary to increase a distance of movement of the occupant's body by increasing a length of the seat belt to be drawn out more than it is required, so that an impact given to the occupant can be effectively reduced even in a vehicle in which an intensity of impact tends to increase. There is provided a fuse belt (5) on the lap belt (26b) located close to the anchor plate (14). When a tension, the intensity of which is higher than a predetermined value, is given to the continuous webbing (26), the lap belt (26b) is drawn out. In the retractor (10) having a clamp, there is provided an energy absorbing mechanism. When a tension, the intensity of which is higher than a predetermined value, is given, a holding force to hold the continuous webbing (26) is released and the shoulder belt (26a) is drawn out while a constant drawing force is being kept. Further, the predetermined value at which the lap belt (26b) is drawn out by the action of the fuse belt (5) is set to be lower than the predetermined value at which the shoulder belt (26a) is drawn out by the energy absorbing mechanism of the retractor (10).

13 Claims, 10 Drawing Sheets

SEAT BELT SYSTEM

BACKGROUND OF THE INTENTION

1. Field of the Invention

The present invention relates to a seat belt system. More particularly, the present invention relates to improvements in a seat belt system having an energy absorbing device to absorb an impact, which acts on an occupant's body, by drawing out a seat belt when a tension, the intensity of which is higher than a predetermined value, is given to the seat belt in the case of emergency of a vehicle.

2. Description of the Related Art

In general, a three point type seat belt system equipped with a continuous webbing is used as a seat belt system to hold an occupant on a seat of a vehicle safely.

As illustrated in FIG. 11, there is provided a continuous webbing 66 in this type seat belt system. One end portion of this continuous webbing 66 is engaged with a retractor (winding device) 60, and the other end portion passes through a through-anchor 13 and is engaged with an anchor plate 14 supported by a lower end portion of a center pillar 18. There is provided a through-tongue 12 in an intermediate portion between the anchor plate 14 and the through-anchor 13. When this through-tongue 12 is engaged with a buckle 11 vertically arranged at a substantial center of the vehicle body, the occupant is restricted on a seat 21. In the above arrangement, the continuous webbing 66 includes: a shoulder belt 66a to hold the breast and shoulder of the occupant between the through-tongue 12 and the through-anchor 13; and a lap belt 66b to fix the waist of the occupant between the through-tongue 12 and the anchor plate 14.

On the other hand, there is provided a retractor composing the above seat belt system which has an emergency lock mechanism to lock a rotation of a winding shaft around which the webbing is wound in the webbing drawing direction in the case of emergency.

However, when an intensity of the impact force is very high in the case of collision, the tension given to the webbing is increased. Accordingly, a sudden deceleration is given to the occupant's body, so that a very heavy load is applied to the occupant by the webbing. The above circumstances are the same as those of a seat belt system having a clamp device by which the webbing is prevented from being drawn out by holding the webbing in the case of emergency. Also, the above circumstances are the same as those of a seat belt system having a pre-tensioner mechanism by which looseness of the webbing is removed by winding in the webbing in the case of emergency so that the occupant can be restricted on a seat in the initial stage of collision.

In order to solve the above problems, there have been proposed various seat belt systems having an energy absorbing mechanism, in which the seat belt is drawn out by a predetermined length when a load given to the webbing exceeds a predetermined value so that an impact given to the occupant's body can be absorbed by the energy absorbing mechanism and the safety of the occupant's body can be more positively ensured.

For example, Japanese Unexamined Utility Model Publication No. Sho 64-14454 discloses a retractor having an energy absorbing mechanism which absorbs an impact force acting on the occupant's body as follows. When a tension, the intensity of which is higher than a predetermined value, is given to the webbing, a deformation member attached to a winding shaft around which the webbing is wound is deformed, so that a winding diameter of the webbing can be reduced and the webbing can be drawn out so as to absorb an impact force given to the occupant's body.

For example, Japanese Unexamined Patent Publication Nos. Hei 3-197257 and Hei 4-252761 and Japanese Unexamined Utility Model Publication No. Hei 4-43550 disclose a retractor having a clamp. This retractor having a clamp operates to protect the occupant's body more positively as follows. When a tension, the intensity of which is higher than a predetermined value, is applied to the webbing, a portion of the rotational holding member to hold the webbing is plastically deformed, or alternatively a case (retractor base) to rotatably support one end portion of the rotatable holding member or a portion of the shaft is deformed or broken, so that a holding force to hold the webbing can be released and a predetermined length of webbing can be drawn out to reduce a deceleration caused in the occupant's body.

Further, for example, Japanese Examined Patent Publication No. Sho 54-20732 discloses a seat belt system having an energy absorbing belt which operates as follows. The warp of webbing is composed of two or more different types of component yarn. When a load acting on the webbing is increased to be higher than a predetermined value, a portion of the component yarn composing the warp is broken, so that an elongation of the webbing is increased. Therefore, kinetic energy given to the seat belt can be absorbed. Alternatively, a portion of the webbing is sown while the portion is folded. When a tension, the intensity of which is higher than a predetermined value, is given to the webbing, the sewing thread is broken, so that the webbing can be drawn out. Thus composed seat belt is referred to as a fuse belt.

Further, Japanese Unexamined Utility Model Publication No. Hei 4-62255 discloses an energy absorbing mechanism in which energy is absorbed when a bent portion of the U-shaped bent plate to support the anchor plate at the stationary end of webbing is plastically deformed.

However, an impact given to a vehicle varies in accordance with the structure of the vehicle. Especially, in the case of a vehicle to which a high intensity of impact tends to be given, even if the above seat belt systems having various energy absorbing mechanisms are used, it is difficult to protect the occupant's body sufficiently. Therefore, it is necessary to further reduce the impact acting on the occupant's body.

However, only when a length of the seat belt to be drawn out is increased in each energy absorbing mechanism described above, a distance of movement of the occupant's body is increased. As a result, there is an increasing possibility of secondary collision of the occupant's body with the steering wheel or instrument panel.

Especially, in the seat belt system in which the energy absorbing mechanism is arranged in the retractor 60, the continuous webbing 66 seldom slides with respect to the through-tongue 12. Therefore, the webbing that has been drawn out from the retractor 60 extends only in a portion of the shoulder belt 66a. As a result, as illustrated in FIG. 12, the upper half of the occupant's body is greatly swung round the waist fixed by the lap belt 66b, and it is impossible for the seat belt system to sufficiently absorb kinetic energy of the upper half of the occupant's body.

It is an object of the present invention to provide a seat belt system having an efficient energy absorbing mechanism by which kinetic energy generated in the occupant's body in the case of vehicle collision can be effectively absorbed even when the vehicle tends to be given an impact of high intensity.

SUMMARY OF THE INVENTION

An object of the present invention can be accomplished by a three-point type seat belt system in which one end of a continuous webbing is engaged with a retractor, the other end of the continuous webbing is engaged with an anchor plate, a through-tongue is arranged in an intermediate portion of the continuous webbing, the through-tongue is engaged with a buckle vertically arranged at a substantial center of the vehicle body, so that the webbing is composed of a shoulder belt to hold the shoulder and waist of an occupant and a lap belt to fix the waist of the occupant, the three-point type seat belt system comprising an energy absorbing mechanism to absorb an impact acting on the occupant's body by drawing out a predetermined length of the seat belt when a load given to the webbing exceeds a predetermined value, wherein the energy absorbing mechanism is arranged on both the shoulder belt side and the lap belt side, and the predetermined value of the energy absorbing mechanism on the lap belt side is set at a value lower than the predetermined value of the energy absorbing mechanism on the shoulder belt side.

In a preferable embodiment, the energy absorbing mechanism on the lap belt side may be comprised of a fuse belt incorporated onto the lap belt, and an anchor plate capable of being deformed which is attached to an end portion of the lap belt.

In another preferable embodiment, the energy absorbing mechanism on the shoulder belt side may be comprised of a retractor by which a predetermined length of the seat belt is drawn out when a plastic deformation member attached to the winding shaft is deformed, and a retractor having a clamp by which a predetermined length of the seat belt is drawn out when a holding force of the clamp mechanism to hold the webbing is released.

According to the above arrangement, when the emergency lock mechanism is operated in the case of vehicle collision and the occupant's body moving forward is restricted, in accordance with the movement of the occupant's body, the webbing tension is increased.

Then, first, an intensity of tension acting on the webbing exceeds a predetermined value of the energy absorbing mechanism on the lap belt side. Accordingly, the lap belt is drawn out from the energy absorbing mechanism on the lap belt side, and the waist of the occupant's body is moved forward while kinetic energy is being consumed. At this time, the shoulder belt, which tends to loosen in the case of wearing the seat belt and the overall length of which is longer than the lap belt, is drawn out when it is given a tension. Accordingly, the upper half of the occupant's body is simultaneously moved forward. In this way, the waist and the upper half of the occupant's body are moved substantially in parallel to each other.

Next, after the lap belt has been drawn out, the webbing tension is increased in accordance with the movement of the occupant's body. Then, the webbing tension is increased to a value higher than the predetermined value of the energy absorbing mechanism arranged on the shoulder belt side. Then, the shoulder belt is drawn out from the energy absorbing mechanism this time. Therefore, the upper half of the occupant's body moves forward while kinetic energy is being consumed.

Accordingly, there is no possibility that the upper half of the occupant's body is greatly swung round the waist, and kinetic energy can be effectively absorbed.

In other words, it is unnecessary to increase a distance of movement of the occupant's body by drawing out the seat belt by an unnecessarily long length. Accordingly, even when the vehicle tends to be given a high intensity of impact, it is possible to effectively reduce the impact applied to the occupant's body.

Another object of the present invention is accomplished by a seat belt system used for restricting a occupant's body, comprising:

a continuous webbing, one end of which is engaged with a retractor and the other end of which is engaged with an anchor plate;

a through-tongue arranged in an intermediate portion of the continuous webbing, the through-tongue dividing the seat belt system into a first portion arranged between the retractor and the through-tongue and a second portion arranged between the through-tongue and the anchor plate;

a first energy absorbing mechanism attached to the retractor operated so that the webbing in the first portion can be drawn out when a load given to the first portion exceeds a first predetermined value; and a second energy absorbing mechanism operated so that the webbing in the second portion can be drawn out when a load given to the second portion exceeds a second predetermined value, wherein the second predetermined value is set to be lower than the first predetermined value.

According to a preferable embodiment, one end of the continuous webbing is engaged with a winding shaft rotatably supported by a retractor base of the retractor, and the first energy absorbing mechanism is arranged between the winding shaft and the through-tongue.

According to another preferable embodiment, the first energy absorbing mechanism includes a clamp mechanism capable of holding a webbing drawn out from the winding shaft, and a plastically deforming member to allow the clamp mechanism to further move in the direction of drawing out the webbing after the clamp mechanism has been set at the webbing holding position.

According to still another preferable embodiment, the plastically deforming member is arranged between the clamp mechanism and the retractor base.

According to still another preferable embodiment, the first energy absorbing mechanism includes a releasing means for releasing the webbing after the clamp mechanism has moved in the webbing drawing direction by a predetermined distance.

According to still another preferable embodiment, the first energy absorbing mechanism includes a further energy absorbing mechanism to allow the continuous webbing to be drawn out from the winding shaft after the webbing has been released by the releasing means.

According to still another preferable embodiment, the further energy absorbing mechanism is attached to the winding shaft.

According to still another preferable embodiment, the further energy absorbing mechanism is attached between an outer circumferential surface of the winding shaft and the webbing and includes a plastically deforming member capable of being plastically deformed in a direction in which the winding diameter of the webbing is reduced.

According to still another preferable embodiment, the first energy absorbing mechanism is attached to the winding shaft.

According to still another preferable embodiment, the first energy absorbing mechanism is attached between an outer circumferential surface of the winding shaft and the webbing and includes a plastically deforming member capable of being plastically deformed in a direction in which the winding diameter of the webbing is reduced.

According to still another preferable embodiment, the second energy absorbing mechanism is comprised of a fuse belt made in such a manner that a portion of the continuous webbing is folded and sown.

According to still another preferable embodiment, a caution label is integrally sown into a portion of the webbing close to the fuse belt.

According to the above arrangement, when an emergency lock mechanism is operated in the case of vehicle collision, and the occupant's body moving forward is restricted, the webbing tension is increased in accordance with the movement of the occupant's body.

Then, a tension acting on the webbing of the second portion is increased to a value higher than the second predetermined value of the second energy absorbing mechanism. Accordingly, the webbing of the second portion is drawn out from the second energy absorbing mechanism, and the waist of the occupant is moved forward while kinetic energy is being consumed. In this case, the webbing of the first portion, which tends to loosen when the occupant wears the seat belt and the overall length of which is longer than the webbing of the second portion, is extended when the continuous webbing is given a tension. Accordingly, the upper half of the occupant's body is moved forward at the same time. In this way, the waist and the upper half of the occupant's body are moved substantially in parallel to each other.

After the webbing of the second portion has been drawn out, the webbing tension is increased in accordance with the movement of the occupant's body. Then, the tension acting on the webbing of the first portion exceeds the first predetermined value of the first energy absorbing mechanism. Therefore, the webbing of the first portion is drawn out by the first energy absorbing mechanism, and the upper half of the occupant's body is moved forward while kinetic energy is being consumed.

Accordingly, there is no possibility that the upper half of the occupant's body is greatly swung round the waist, and kinetic energy is effectively absorbed.

In other words, it is unnecessary to increase a distance of movement of the occupant's body by drawing out the seat belt by an unnecessarily long length. Accordingly, even when the vehicle tends to be given an impact of high intensity, it is possible to effectively reduce the impact applied to the occupant's body.

THE MOST PREFERRED EMBODIMENTS

Referring to the accompanying drawings, embodiments of the present invention will be explained in detail as follows.

Figure 1:
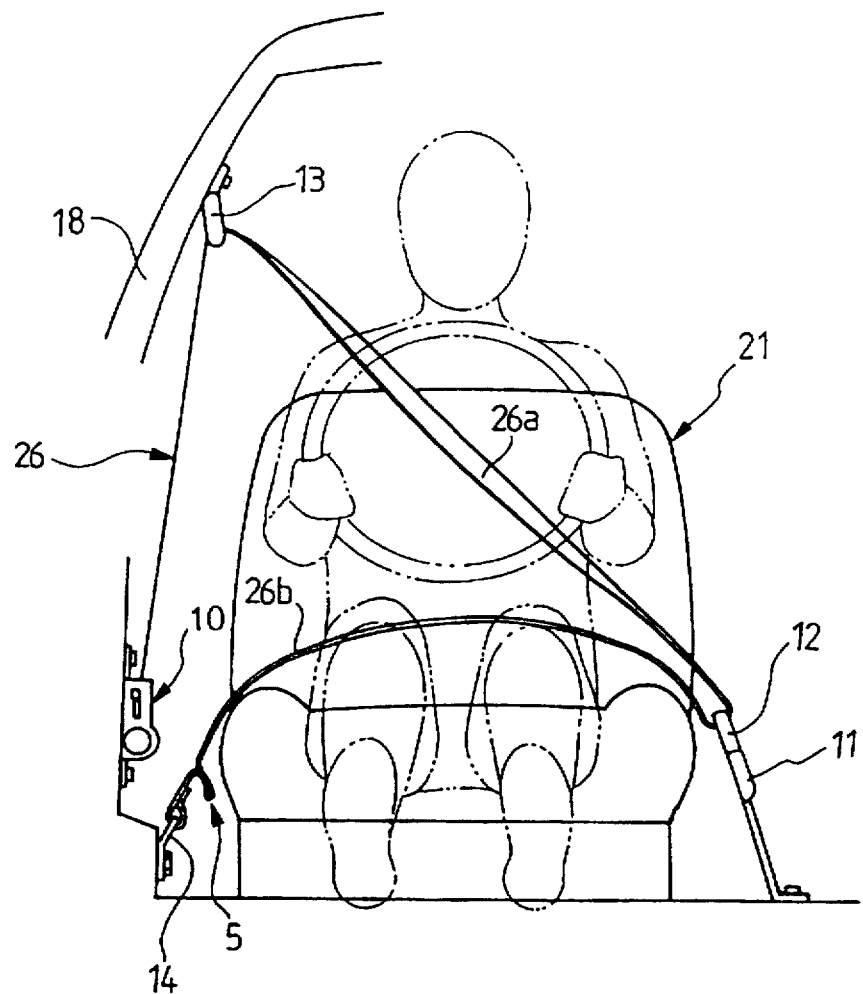
FIG. 1 is an overall arrangement view of the three-point type seat belt system of the first embodiment of the present invention.

FIG. 1 is an overall arrangement view of the three-point type seat belt of the first embodiment of the present invention. One end portion of the continuous webbing 26 is engaged with the retractor 10 having a clamp, and the other end portion passes through the through-anchor 13 and is engaged with the anchor plate 14 supported by a lower end portion of the center pillar 18. There is provided a through-tongue 12 in an intermediate portion of the webbing between the anchor plate 14 and the through-anchor 13. The above through-tongue 12 is engaged with the buckle 11 vertically arranged in a substantial center of the vehicle body. An occupant is restricted onto the seat 21 by the thus arranged seat belt. In the above arrangement, the continuous webbing 26 is comprised of a shoulder belt 26a to hold the breast and shoulder of the occupant between the through-tongue 12 and the through-anchor 13, and a lap belt 26b to fix the waist of the occupant between the through-tongue 12 and the anchor plate 14.

When the through-tongue 12 is assumed to be a reference, the seat belt system is comprised of a first portion between the retractor 10 and the through-tongue 12, and a second portion between the through-tongue 12 and the anchor plate 14.

Figure 2:
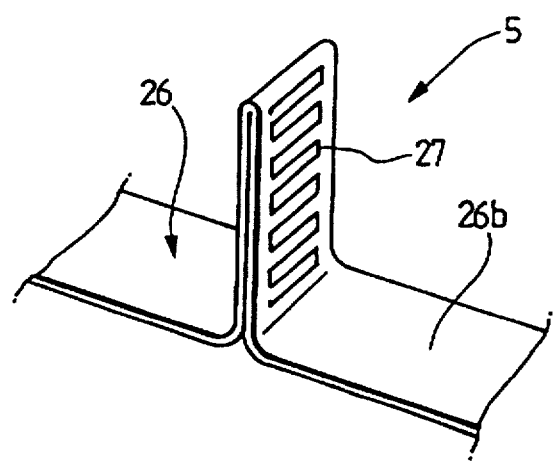
FIG. 2 is an enlarged perspective view of the fuse belt shown in FIG. 1.

The lap belt 26b positioned close to the anchor plate 14 includes a fuse belt 5 which is an energy absorbing mechanism (a second energy absorbing mechanism) arranged on the lap belt side. As illustrated in FIG. 2, the fuse belt 5 is composed in such a manner that a portion of the lap belt 26b is folded and sown, and the sewing thread 27 is broken and the lap belt 26b is drawn out when a tension, the intensity of which is higher than a predetermined value A (a second predetermined value) previously set in the webbing 26, is given to the fuse belt 5. In general, the continuous webbing 26 seldom slides with respect to the through-tongue 12. Accordingly, when the webbing 26 is drawn out by the action of the fuse belt 5, only the lap belt 26b is extended. It is preferable that the lap belt 26b is extended by the length of 100 to 200 mm when the above fuse belt 5 is operated, and an operation load of the fuse belt 5 is set in a range from 3 to 4 kN.

On the other hand, in the retractor 10 having a clamp by which the continuous webbing can be automatically wound, there is provided a shoulder belt side energy absorbing mechanism (a first energy absorbing mechanism), which is composed as follows. When the continuous webbing 26 is given a tension, the intensity of which is higher than a predetermined value B (a first setting value), a holding force of the retractor 10 to hold the continuous webbing 26 is released so that the belt can be drawn out while a constant drawing force is being kept.

Figure 3:
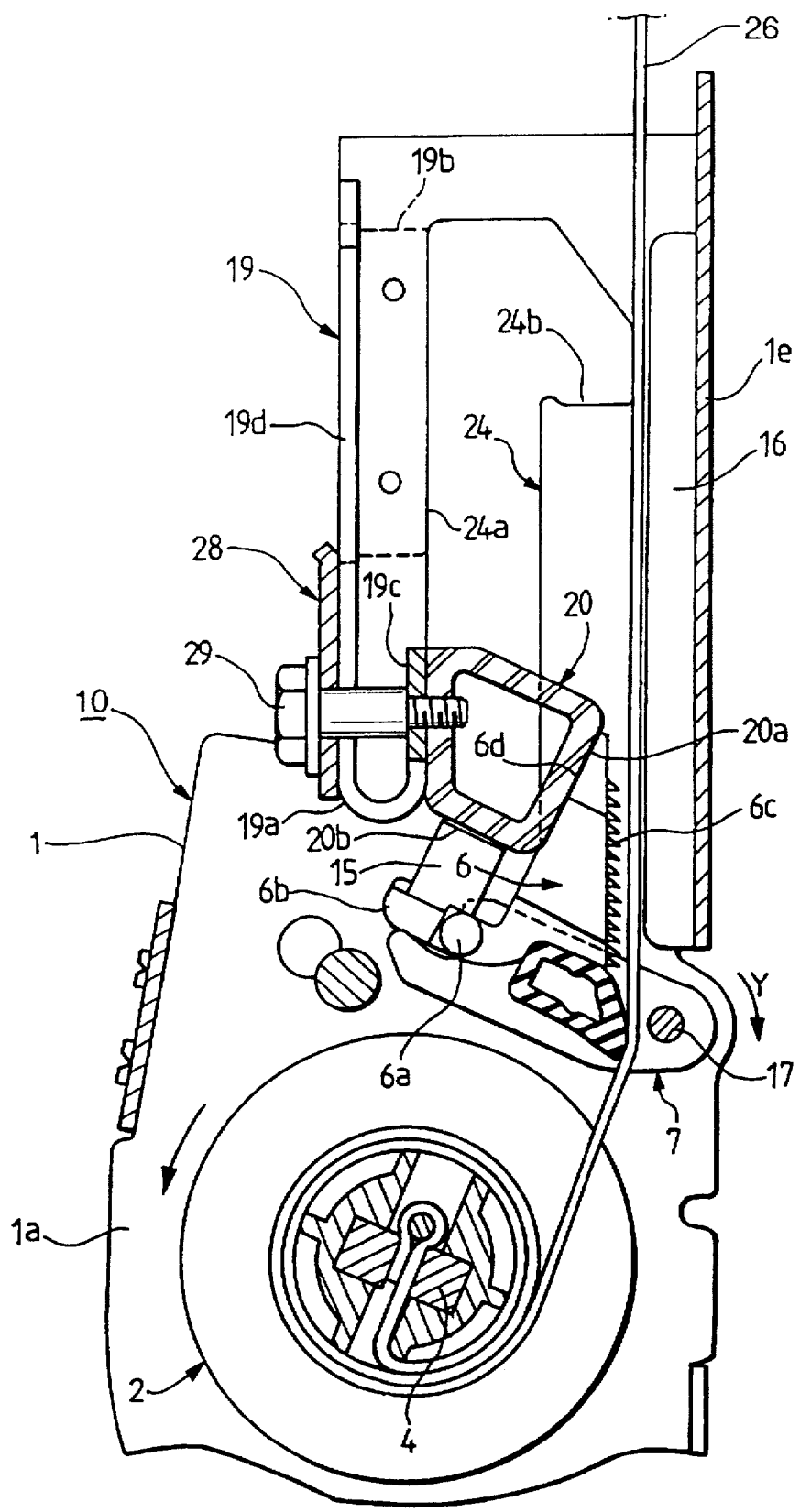
FIG. 3 is a longitudinal cross-sectional view showing a primary portion of the retractor having a clamp shown in FIG. 1.

FIG. 3 is a longitudinal cross-sectional view of the primary portion of the retractor 10 having a clamp. In the retractor 10, there is provided a retractor base 1, the section of which is formed into a C-shape. On each side plate 1a, 1a of the retractor base 1, there is formed a through-hole. In this through-hole, there is rotatably provided a winding shaft 4 to which a bobbin 2 is attached, and the continuous webbing 26 is wound round the bobbin 2. At one end of the winding shaft 4, there is provided a well known winding spring device not shown in the drawing. The winding shaft 4 is energized by the winding spring device at all times in a direction of winding the continuous webbing 26 (clockwise in the drawing).

At the other end of the winding shaft 4, there is provided a well known emergency lock mechanism not shown in the drawing. In the case of emergency such as a collision of a vehicle, the emergency lock mechanism prevents a rotation of the winding shaft 4 in the webbing drawing direction (counterclockwise in the drawing), so that the continuous webbing 26 can not be drawn out.

In an upper portion inside the retractor base 1, there is provided a clamp mechanism to stop the drawing of the continuous webbing 26 when the clamp mechanism directly holds the continuous webbing 26.

As illustrated in FIG. 3, the clamp mechanism includes: a wedge-shaped clamp 6 on which a clamp tooth portion 6c is formed to increase the frictional resistance with respect to the webbing surface so as to fasten the continuous webbing 26; an upper plate 20 sliding on a plane portion 6d located on the side opposite to the surface on which the clamp tooth portion 6c is formed; and an upper stay 19 to restrict a movement of the upper plate 20 in the webbing drawing direction.

The upper plate 20 is a hollow member made of metal, the section of which is a substantial trapezoid, and the longitudinal length of the trapezoid is longer than the interval of the base side plates 1a, 1a opposed to each other. This upper plate 20 has a sliding surface 20a slidably coming into contact with the plane portion 6d of the clamp 6. There are formed through-holes 24 on the base side plates 1a, 1a opposed to each other. Each through-hole 24 includes: a guide portion 24a which is a long hole extending along the base back plate 1e of the retractor base 1 in the same direction; and an inserting portion 24b which is an opening communicated with the upper end of the guide portion 24a and the shape of the opening is substantially the same as the transversely cross-sectional shape of the upper plate 20.

The upper plate 20 is inserted from the inserting portion 24b, and both end portions are set in the guide portion 24a. Therefore, a movement of the upper plate 20 in the longitudinal direction is restricted, and the upper plate 20 is engaged with the through-hole 24 while the upper plate 20 is capable of moving freely with respect to the base back plate 1e in parallel.

Attaching portions 19b on both side edges of the upper stay 19 are fixed onto the base side plates 1a, 1a of the retractor base 1 by screws, and the lower end portion of the upper stay 19, which is bent into a J-shape, is fixed to the upper plate 20 by bolts. In this way, a movement of the upper plate 20 in the webbing drawing direction is restricted.

The upper stay 19 is formed from a metallic sheet into a predetermined shape by means of punching and bending. At both side edges of the upper stay 19, the attaching portions 19b are formed. The thus formed rectangular upper stay 19 extends downward, and a pair of leg portions connecting to the upper plate fixing portion 19c are formed in such a manner that the lower end portions are bent to the inside of the base into a J-shape. In this way, the plastically deforming portion 19a is formed. There is formed a long hole 19d extending along the base back plate 1e in the upper end portion of the base body.

The fixing bolt 29 is inserted into the through-hole of the slide plate 28 attached onto the outer side of the upper stay 19, and also the fixing bolt 29 is inserted into the long hole 19d. In this way, the fixing bolt 29 is inserted into the hole of the upper plate fixing portion 19c. This fixing bolt 29 is screwed to the upper plate 20. Due to the foregoing arrangement, as illustrated in FIG. 3, the upper plate 20 can be held in the following condition. The slide surface 20a to guide the clamp 6 to a webbing fastening position is held at a predetermined inclination angle with respect to the lower plate 16 fixed to the base back plate 1e of the retractor base 1 in such a manner that the slide surface 20a comes close to the lower plate 16 on the upper side. At the same time, the upper plate 20 is held in a condition in which a movement in the webbing drawing direction is restricted.

There is provided a return spring 15 between the engaging portion 6b protruding on the rear end side of the clamp 6 and the rear end surface 20b of the upper plate 20. This return spring 15 pushes the clamp 6 in a direction in which the clamp 6 is not engaged with the continuous webbing 26.

In the lower portion of the clamp 6, there is provided a lever member 7 to restrict a movement of the clamp 6. This lever member 7 is linked with an emergency lock mechanism not illustrated in the drawing, so that the clamp 6 is moved in the webbing fastening direction. This lever member 7 is rotatably supported by a lever pin 17 attached onto the base side plates 1a, 1a, and a shaft 6a protruding onto the side wall of the clamp 6 is held by an oscillating end portion of the lever member 7.

In the case of emergency in which the emergency lock mechanism not shown in the drawing prevents a rotation of the winding shaft 4 in the webbing drawing direction, the lever member 7 oscillates while the lever member 7 resists a pushing force of the return spring 15. Therefore, the shaft 6a of the clamp 6 is pushed by the lever member 7. Due to the foregoing motion, while the plane portion 6d is made to slide on the sliding surface 20a, the clamp 6 is moved in a direction so that the clamp 6 can be engaged with the continuous webbing 26.

Next, referring to FIG. 5, operation of the above seat belt system will be explained below.

In the normal operating condition, as illustrated in FIG. 3, the clamp 6 is pushed by the return spring 15 in the direction in which the clamp 6 is not engaged with the continuous webbing 26, and further the emergency lock mechanism is in a non-operating condition. Accordingly, the continuous webbing can be freely drawn out.

When the emergency lock mechanism is operated in the case of a sudden braking operation or light collision, a rotation of the winding shaft 4 in the webbing drawing direction is checked and at the same time the lever member 7 is rotated in the direction of arrow Y in the drawing. Accordingly, the clamp 6 is immediately moved upward along the sliding surface 20a of the upper plate 20, resisting a pushing force of the return spring 15. That is, the clamp 6 bites into between the sliding surface 20a and the lower plate 16, so that the continuous webbing 26 can be held by the clamp 6.

In this case, a vertical reaction force is generated between the clamp 6, which holds the continuous webbing 26, and the upper plate 20, and the upper plate 20 is given a pushing force so that the upper plate 20 can be moved along the guide portion 24a in the webbing drawing direction. Accordingly, the plastically deforming portion 19a of the upper stay 19 is given a bending force to move the upper plate 20 and the upper plate fixing portion 19c to an upper portion of the retractor.

However, in the case where the tension F given to the continuous webbing 26 by an occupant who moves forward is lower than a predetermined value B and also in the case where the load given to the plastically deforming portion 19a of the upper stay 19 via the clamp 6 and the upper plate 20 is lower than a predetermined value, since the rigidity of the plastically deforming portion 19a is sufficiently high so that the plastically deforming portion 19a can not be deformed, a movement of the upper plate 20 in the webbing drawing direction is restricted, and the continuous webbing 26 is held between the clamp 6 and the lower plate 16. Therefore, the continuous webbing 26 is not drawn out.

In this case, if the tension F acting on the continuous webbing 26 is lower than the predetermined value A that has been previously set on the fuse belt 5, the sewing thread 27 is not broken. Accordingly, there is no possibility that the fuse belt 5 is operated and the lap belt 26b is drawn out. In this connection, the predetermined value A of the fuse belt 5 at which the drawing of the lap belt 26b starts is determined to be lower than the predetermined value B of the retractor 10 having a clamp at which the deformation of the plastically deforming portion 19a starts.

Figure 5A:
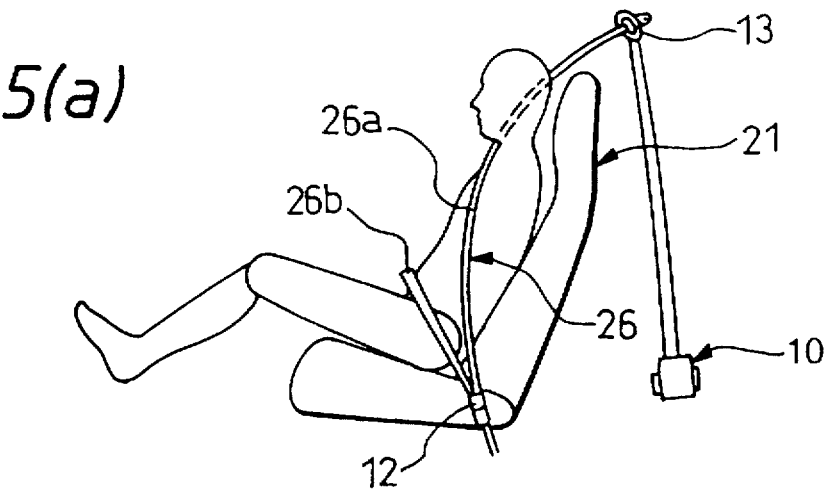
FIGS. 5(a), 5(b) and 5(c) are schematic illustrations to explain the operation of the three-point type sheet belt system shown in FIG. 1.

Accordingly, when the tension F acting on the continuous webbing 26 is lower than the predetermined value A previously set on the fuse belt 5 and the predetermined value B previously set on the retractor 10 having a clamp, the occupant's body to be moved forward is restricted onto the seat 21 as illustrated in FIG. 5a, so that the occurrence of secondary collision can be prevented. When the tension acting on the continuous webbing 26 is released, no force is given to the clamp 6 to hold it in the holding direction. Accordingly, the clamp 6 is moved by the pushing force of the return spring 15 in a direction in which the clamp 6 is not engaged with the continuous webbing 26, so that the clamp mechanism can be released and at the same time the emergency lock mechanism can be released. In this way, the continuous webbing 26 can be freely drawn out.

Figure 5B:
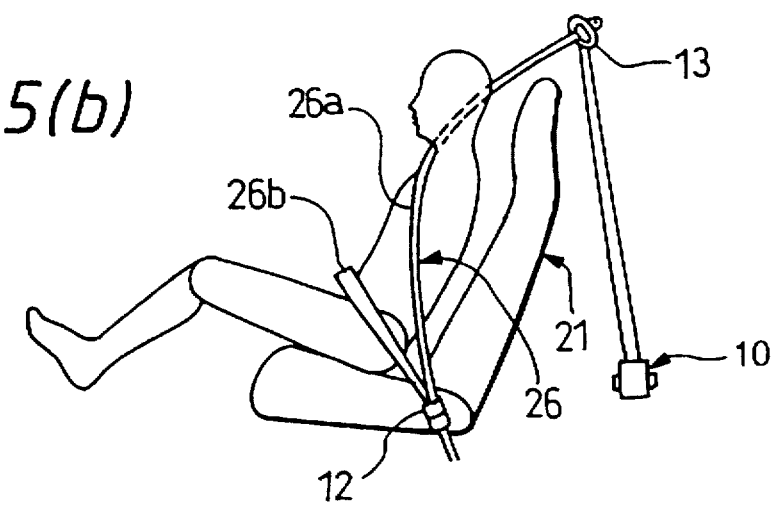

However, in the above clamping condition, when an impact force is extremely increased in the case of collision so that the tension F given to the continuous webbing 26 is further increased, first, the tension given to the continuous webbing 26 is increased to a value higher than the predetermined value A of the fuse belt 5. Due to the foregoing, the sewing thread 27 is broken, and the lap belt 26b is drawn out, and the occupant's waist is moved forward while kinetic energy is being consumed. At this time, the shoulder belt 26a, which tends to loosen when the occupant wears the seat belt and the overall length of the shoulder belt 26a is longer than that of the lap belt 26b, is extended when the extremely high tension is given to the continuous webbing 26. Accordingly, the upper half of the occupant's body is simultaneously moved forward. As a result, as illustrated in FIG. 5b, the waist and the upper half of the occupant's body are moved forward substantially in parallel to each other.

After the lap belt 26b has been drawn out and the webbing tension has been increased in accordance with the movement of the occupant's body, the tension F acting on the continuous webbing 26 is increased to a value higher than the setting value B of the retractor 10 having a clamp.

Then the clamp 6 moves the upper plate fixing portion 19c upward together with the upper plate 20, and a bending force acting on the plastically deforming portion 19a of the upper stay 19 is increased to a value higher than a predetermined value. Therefore, in accordance with the movement of the clamp 6 in the webbing drawing direction, the upper plate 20 is moved together with the clamp 6 in the webbing drawing direction while the plastically deforming portion 19a is being plastically deformed.

Figure 4:
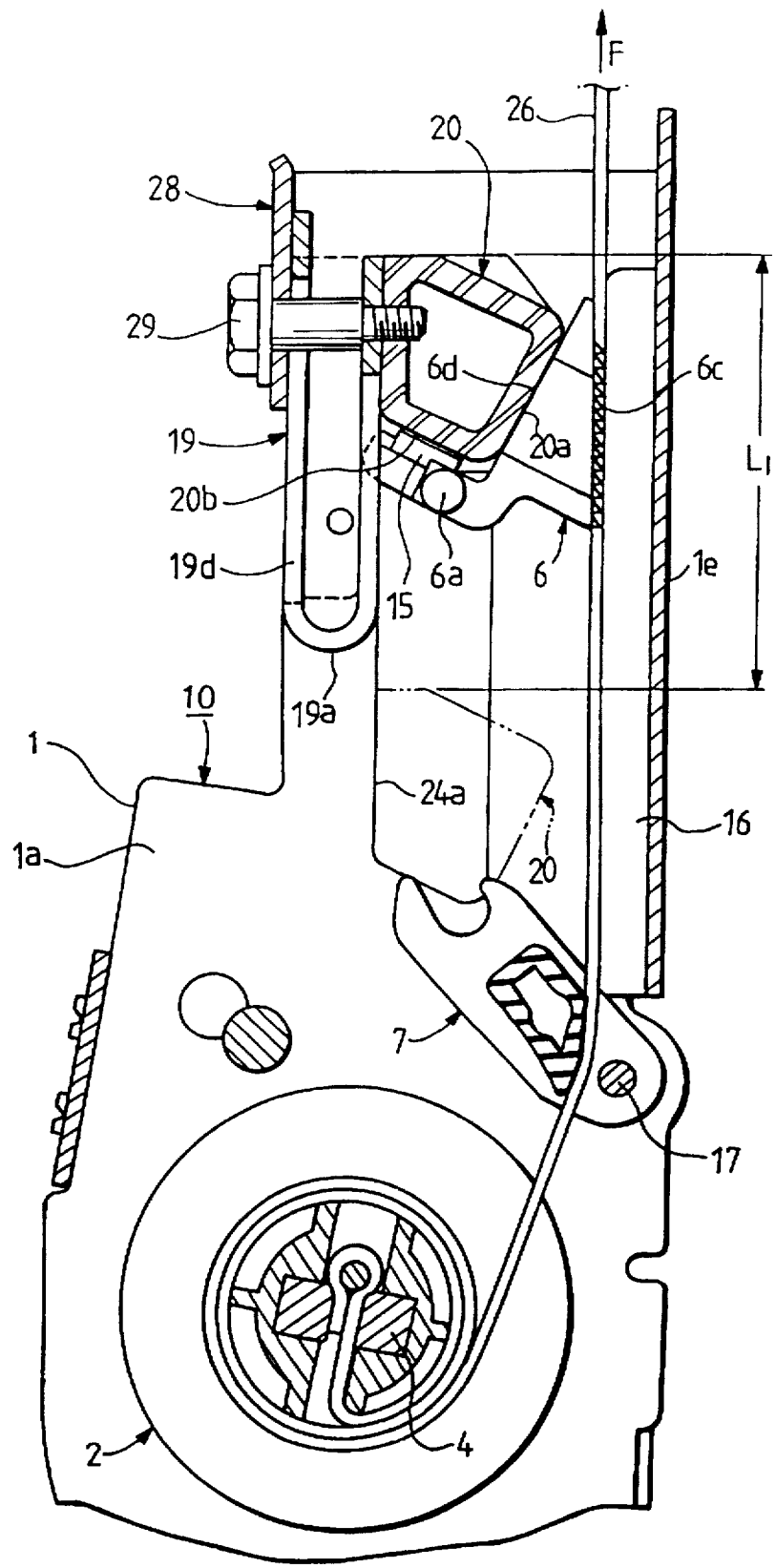
FIG. 4 is a longitudinal cross-sectional view showing a primary portion of the retractor having a clamp shown in FIG. 3, wherein this view is used for making explanations of operation of the retractor.

Then, as illustrated in FIG. 4, the upper plate 20 is moved in the webbing drawing direction by the stroke $L_1$ while the upper stay 19 is being deformed, and at the same time the continuous webbing 26 wound round the bobbin 2 is fastened, so that it extends by the length $L_1$. At this time, the continuous webbing 26 seldom slides with respect to the through-tongue 12. Accordingly, the webbing that has been drawn out from the retractor 10 becomes an extension of the shoulder belt 26a.

In this way, kinetic energy of the upper half of the occupant's body moving forward is effectively consumed by the deformation resistance of the upper stay 19 and the winding fastening resistance of the continuous webbing 26. At the same time, it is possible to prevent a sudden drop of the tension of the continuous webbing 26 when the clamp is released. Accordingly, the continuous webbing 26 can be drawn out from the retractor 10 while a constant intensity of drawing force is maintained. Therefore, an increase of load given again to the occupant's body can be prevented after the load given to the occupant's body has been once dropped.

Figure 5C:
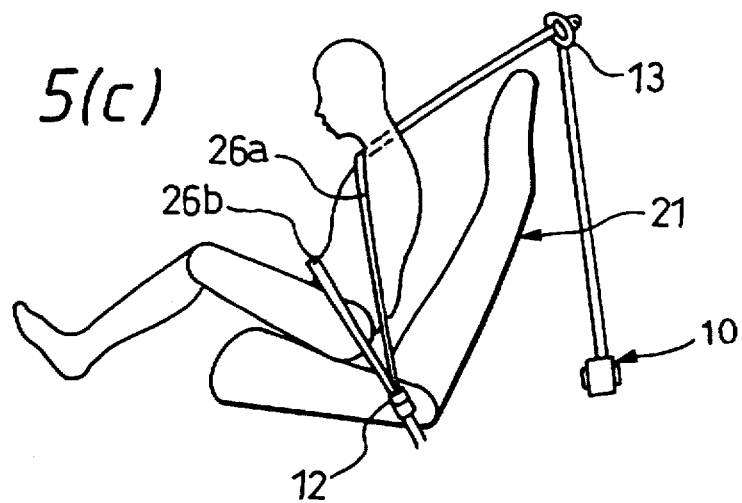

The waist of the occupant's body, which becomes a center of oscillation when the upper half of the occupant's body is swung in the case of collision of a vehicle, is previously moved forward while kinetic energy is being consumed when the lap belt 26b is drawn out by the action of the fuse belt 5. After that, when the upper half of the occupant's body is moved forward, kinetic energy is effectively consumed by the energy absorbing mechanism of the retractor 10 having a clamp, and the upper half of the occupant's body is swung forward as illustrated in FIG. 5c.

Accordingly, the upper half of the occupant's body is not swung greatly round the waist, and kinetic energy of the occupant's body can be effectively absorbed. Therefore, the kinetic energy absorbing property can be enhanced. As a result, it is not necessary to greatly increase a distance of movement of the occupant's body by increasing a length of the seat belt to be drawn out. Therefore, even in the case of a vehicle in which an intensity of the collision impact tends to increase, an impact given to the occupant's body can be effectively reduced.

Figure 6:
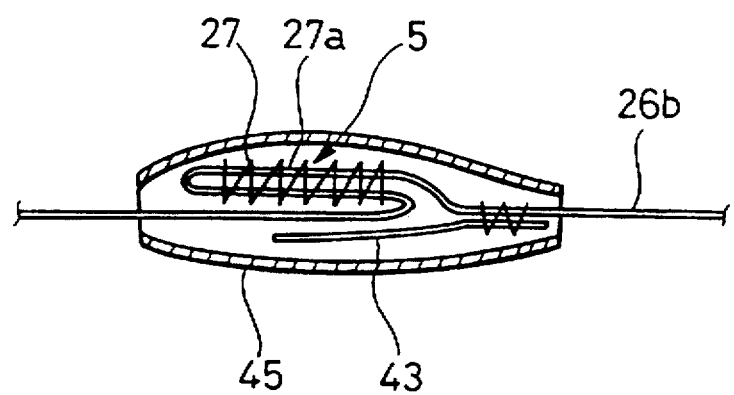
FIG. 6 is a schematic illustration of the fuse belt of the second embodiment of the present invention.

In this connection, concerning the energy absorbing mechanism arranged on the lap belt side, it is possible to adopt an arrangement to which a caution label is added as illustrated in FIG. 6.

In the second embodiment shown in the drawing, in the same manner as that shown in the first embodiment, the fuse belt 5 is composed in such a manner that a portion of the lap belt 26b is folded and sown by the sewing thread 27. Further, the caution label 43 is sown onto the lap belt 26b in a portion close to the folding portion 27a. The folding-portion 27a and the caution label 43 are covered with a cover 45.

The fuse belt 5 is operated as follows in the same manner as that of the first embodiment. When the continuous webbing 26 is given a tension, the intensity of which is higher than the predetermined value A, the sewing thread 27 is broken and the folding portion 27a is extended and exposed to the outside of the cover. At this time, the caution label is simultaneously drawn out to the outside of the cover 45. For this reason, it is possible for the occupant to recognize that the energy absorbing mechanism on the lap belt side has operated.

When the intensity of tension is further increased and the continuous webbing 26 is given a tension, the intensity of which is higher than the predetermined value B, the energy absorbing mechanism is operated as explained above. After the completion of vehicle collision, no tension is applied to the continuous webbing 26. Therefore, the continuous webbing 26 is wound into the retractor 10. However, in this case, a portion of the energy absorbing mechanism on the shoulder belt side has been already lost, that is, a range of the upper stay 19, which was subjected to plastic deformation, has been lost. Therefore, it is necessary to make the occupant recognize that a portion of the energy absorbing mechanism on the shoulder belt side has been already lost. In this connection, the tension A by which the energy absorbing mechanism on the lap belt side is operated is determined to be lower than the tension B by which the energy absorbing mechanism on the shoulder belt side is operated. For this reason, whenever the energy absorbing mechanism on the shoulder belt 26a side is operated, the energy absorbing mechanism on the lap belt 26b side is always operated.

Accordingly when the occupant checks that the caution label 43 has been drawn out, it is possible to warn the occupant that the energy absorbing function on the lap belt 26b side has been lost and the energy absorbing function on the shoulder belt 26a side may have been lost.

Also, in the first embodiment, when the sewing thread 27 of the lap belt 26b is broken, the same effect as that of the caution label of the second embodiment can be provided.

In this connection, in the present invention, the energy absorbing mechanism (the second energy absorbing mechanism) on the lap belt side is not limited to the specific fuse belt 5 shown in the first and the second embodiment. It is possible to adopt various energy absorbing mechanism. For example, it is possible to adopt an arrangement composed in such a manner that the attaching portion of the anchor plate 14 is plastically deformed and moved so that energy can be absorbed by the plastic deformation.

In this connection, in the present invention, the energy absorbing mechanism (the first energy absorbing mechanism) on the shoulder belt side is not limited to the specific energy absorbing mechanism of the retractor 10 having a clamp in the first embodiment. Of course, it is possible to adopt various energy absorbing mechanism.

Figure 7:
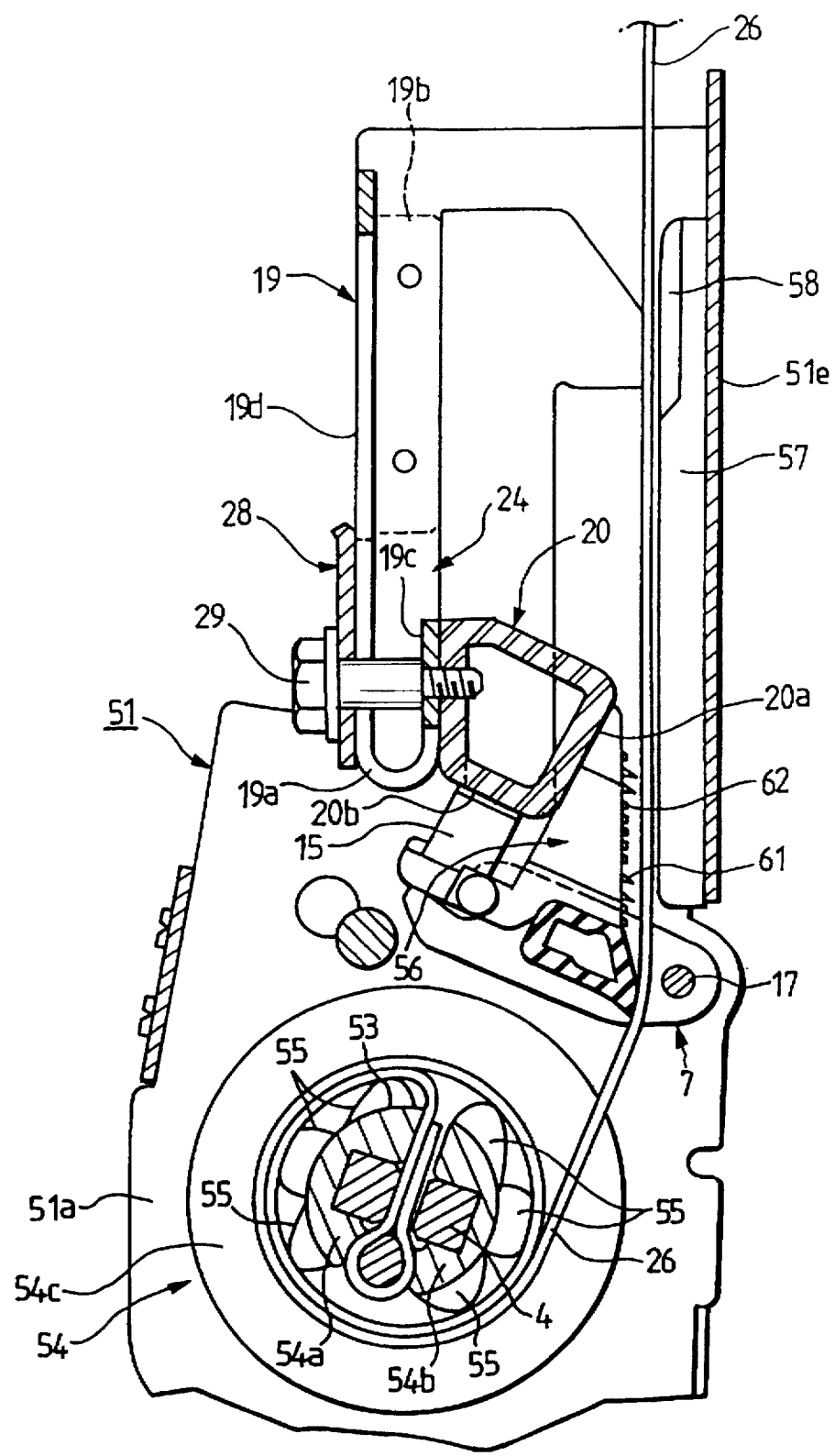
FIG. 7 is a longitudinal cross-sectional view showing a primary portion of the retractor having a clamp of the third embodiment of the present invention.
Figure 8:
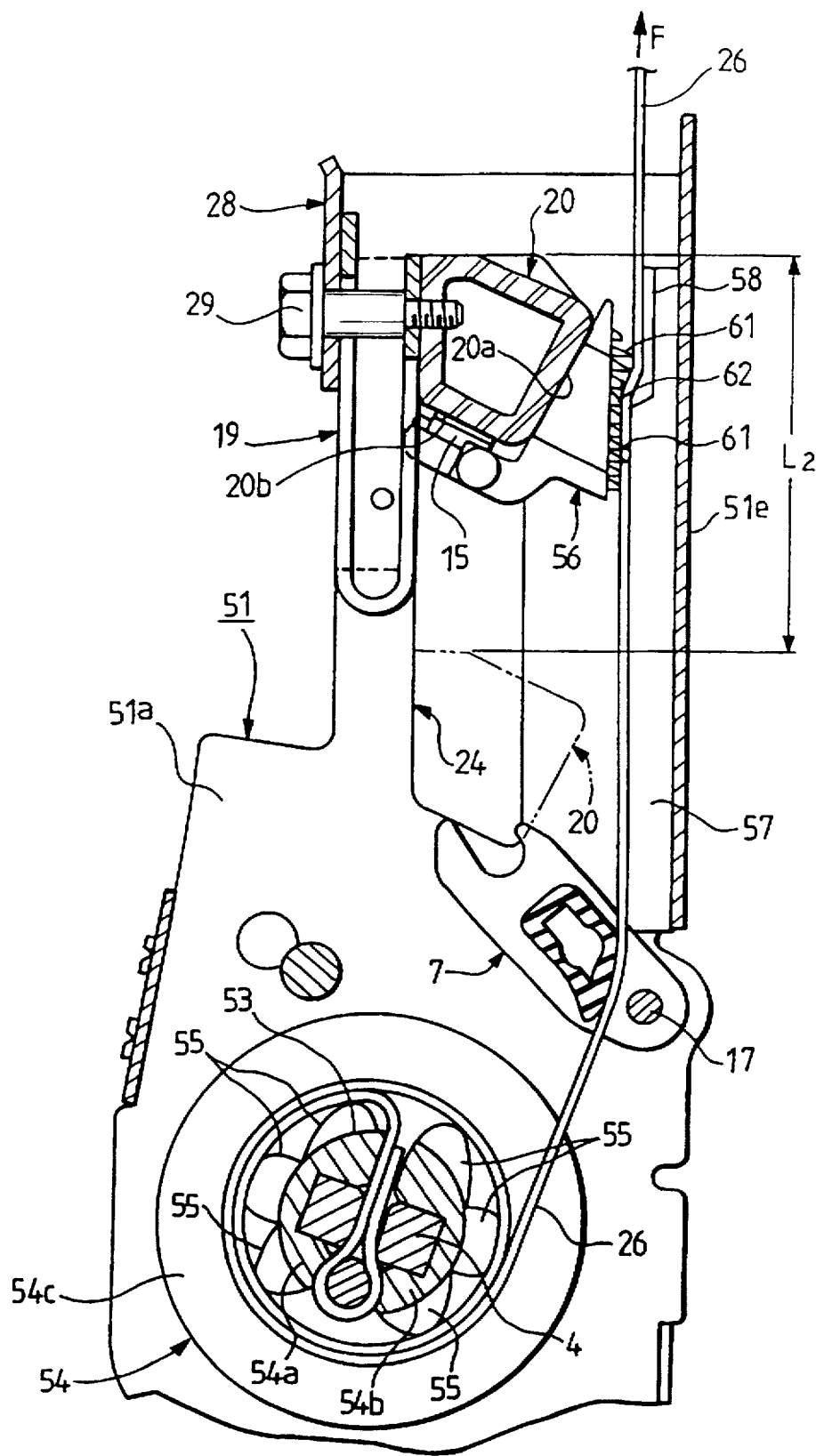
FIG. 8 is a longitudinal cross-sectional view showing a primary portion of the retractor having a clamp shown in FIG. 7, wherein this view is used for making explanations of operation of the retractor.

For example, FIGS. 7 and 8 are longitudinal cross-sectional views showing a primary portion of the retractor 51 having a clamp including a shoulder side energy absorbing mechanism (the first energy absorbing mechanism) of the third embodiment of the present invention. Detailed explanations of the same components as those of the first embodiment are omitted here.

The bobbin 54 around which the continuous webbing 26 is wound includes: a pair of drum portions 54a, 54b around which the continuous webbing 26 is wound; and disk-shaped flange portions 54c arranged at both end portions of these drum portions 54a, 54b. This bobbin 54 is rotatably supported by a pair of side walls 51a, 51a via a winding shaft 4 penetrating these drum portions 54a, 54b. Therefore, the bobbin 54 is rotated integrally with the winding shaft 4. A base end portion of the continuous webbing 26 is fixed to the drum portions 54a, 54b of the bobbin 54.

As disclosed in Japanese Unexamined Utility Model Publication No. Sho 64-14454, on the outer circumferences of the drum portions 54a, 54a of the bobbin 54, there are provided ribs 55 which are plastically deforming members to further draw out the continuous webbing 26 by reducing the actual winding diameter of the bobbin 54 when the members are deformed by the load given to the continuous webbing 26. These ribs 55 are composed in such a manner that a large number of radial protrusions are protruded outward being arranged at appropriate intervals on the outer circumferential surface 53 of the drum portion which composes the inner circumference.

In this connection, these ribs 55 are formed from a sheet made of metal such as aluminum or aluminum alloy, or synthetic resin. When a tension given to the continuous webbing 26 is increased to a value not less than a predetermined one, these ribs 55 are plastically deformed by the winding force, so that the actual winding diameter is reduced. After the clamp mechanism described later has released the restriction of the continuous webbing, these ribs 55 are plastically deformed so as to draw out the continuous webbing 26.

In the third embodiment, on the surface of the clamp 56 opposed to the webbing 26, there are provided two types of engaging protrusions at appropriate intervals. One type of the engaging protrusions are the first engaging protrusions 61, the ends of which are sharp forming acute angles, and the other type of the engaging protrusions are the second engaging protrusions 62, the ends of which are flat. When the sharp end portions of the first engaging protrusions 61 pierce the continuous webbing 26, it is possible to prevent the continuous webbing 26 from being drawn out, and when the flat surfaces of the second engaging protrusions 62 are pushed against the surface of the continuous webbing 26 so that the continuous webbing 26 can be held between the second engaging protrusions 62 and the lower plate 57, it is possible to prevent the continuous webbing 26 from being drawn out.

On an upper surface on the front end side of the lower plate 57 to hold the seat belt in cooperation with the clamp 56, there are arranged a recess portion 58 to relieve the continuous webbing 26 so that the continuous webbing 26 can be disengaged from a predetermined number of the first engaging protrusions 61, which have pierced the continuous webbing. 26, when the clamp is moved by the influence of the plastic deformation of the upper stay 19. When the residual first engaging protrusions 61 not corresponding to the above recess 58 are broken or deformed, the webbing is released. In this way, the releasing means for releasing the webbing is arranged.

As illustrated in FIG. 8, in the retractor 51 having a clamp of the third embodiment of the present invention, under the condition that the movement of the clamp 56 caused by the plastic deformation of the upper stay 19 has been completed, that is, when the clamp 56 has been moved by the stroke $L_2$ in FIG. 8, the first engaging protrusions 61 provided on the front end side of the clamp 56 are disengaged from the webbing 26 by the action of the recess 58 to relieve the belt formed on the lower plate 57.

Therefore, only the first engaging protrusions 61 on the rear end side of the clamp 56, which maintain the engaging condition with the webbing 26, are broken or deformed. Due to the foregoing, it is possible to reduce the intensity of tension acting on the webbing, and it is also possible to absorb kinetic energy acting on the webbing.

After the webbing has been released by the break or deformation of the first engaging protrusions 61, plastic deformation of the ribs 55 concerned starts by the load given to the ribs 55 provided on the outer circumference of the bobbin 54 in accordance with the progress of winding. Therefore, the actual winding diameter of the bobbin 54 is reduced. Due to the foregoing, it becomes possible to further draw out the webbing, and at the same time it becomes possible to reduce the intensity of an impact given to the occupant's body when kinetic energy is absorbed in the process of plastic deformation of the ribs 55.

Accordingly, in the energy absorbing mechanism (the first energy absorbing mechanism) on the shoulder belt side of the retractor 51 having a clamp, there is provided an energy absorbing mechanism to further allow the continuous webbing 26 to be drawn out from the winding shaft 4 after the release of the webbing by the releasing means.

Accordingly, when the retractor 51 having a clamp of the third embodiment of the present invention is used instead of the retractor 10 having a clamp of the seat belt system of the first embodiment, the kinetic energy absorbing property for the occupant can be enhanced while the occupant's body is restricted early by the clamp mechanism. In this connection, the releasing means for releasing the webbing after the clamp mechanism has been moved by a predetermined distance in the webbing drawing direction is not limited to the relief recess 58 and the first engaging protrusions 61 described in this embodiment. For example, it is possible to compose the releasing means by separating the upper plate 20 to guide the clamp 56 from the retractor base 1.

Figure 9:
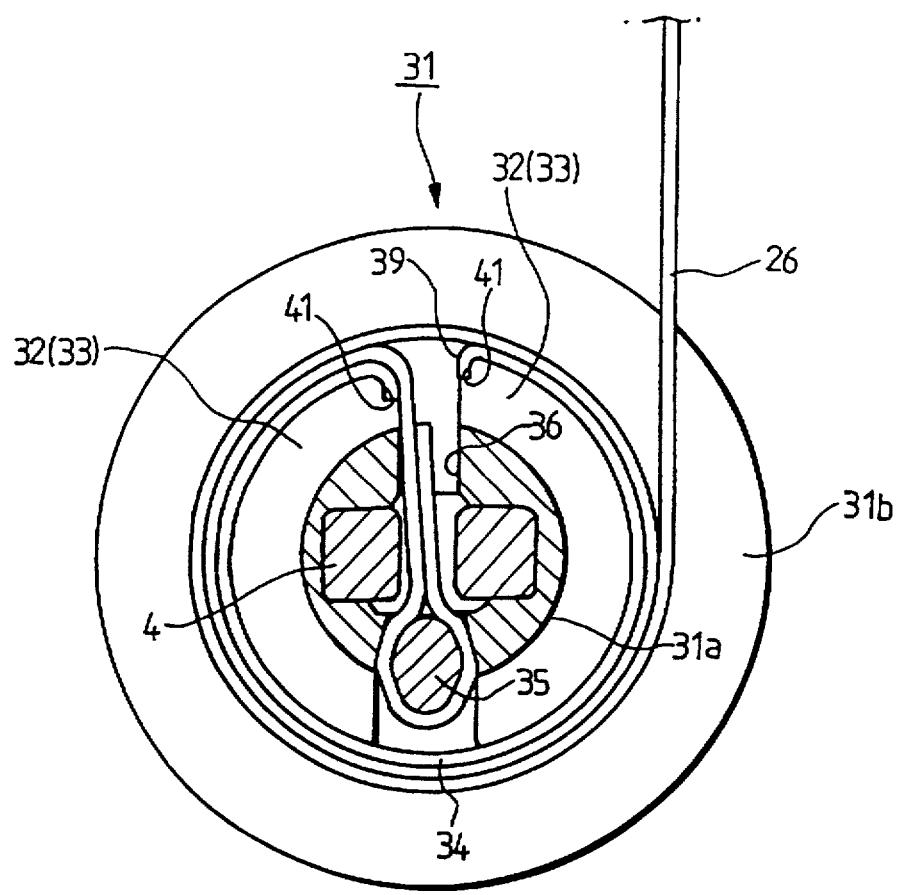
FIG. 9 is a transverse cross-sectional view of the bobbin of the fourth embodiment of the present invention.
Figure 10:
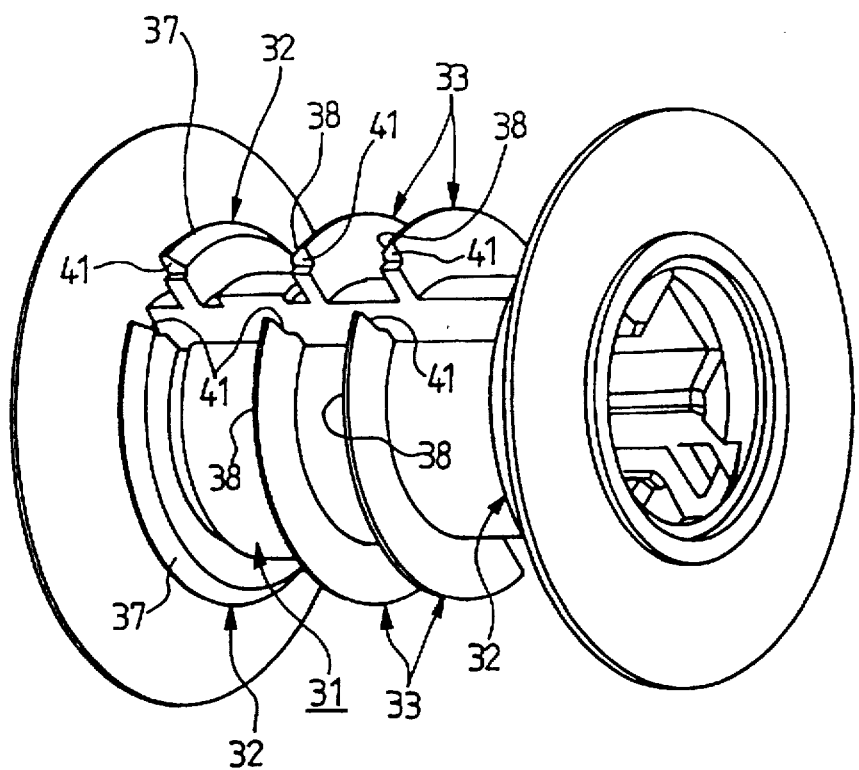
FIG. 10 is an overall perspective view of the bobbin shown in FIG. 9.
Figure 11:
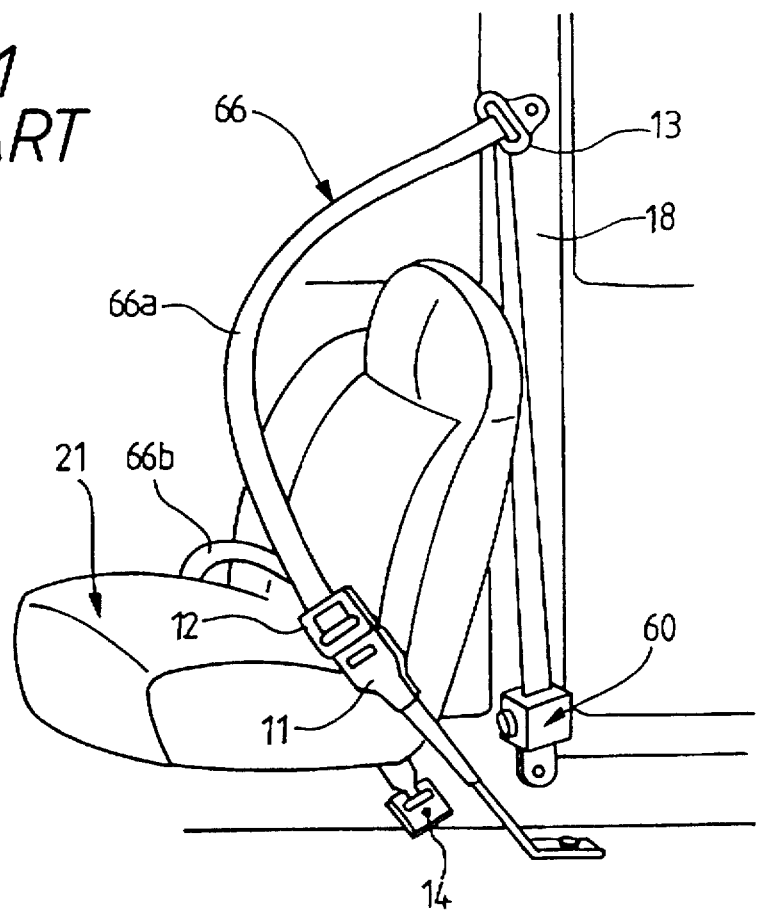
FIG. 11 is an overall arrangement view of the conventional three-point type seat belt system.
Figure 12:
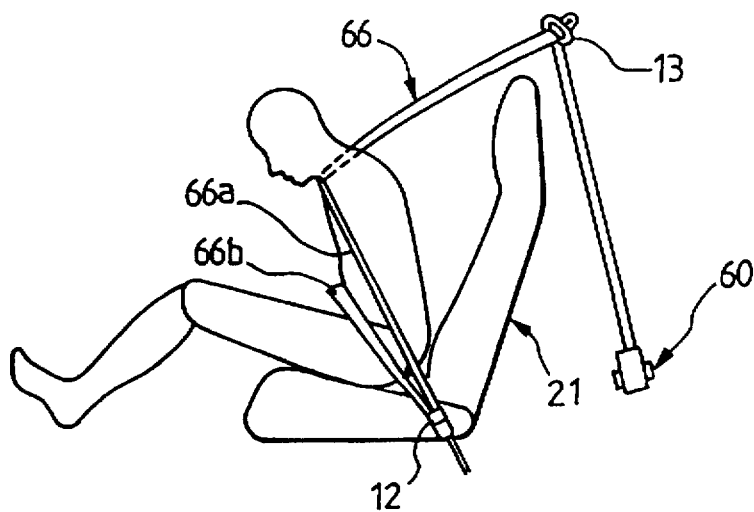
FIG. 12 is a schematic illustration showing an operating state of the three-point type seat belt system illustrated in FIG. 11.

FIGS. 9 and 10 are respectively a transverse cross-sectional view and an overall perspective view of the bobbin 31 having an energy absorbing mechanism (the first energy absorbing mechanism) provided on the shoulder belt according to the fourth embodiment of the present invention.

At both ends of the bobbin 31, there are provided flanges 31b. On the outer circumferential surface of the drum portion 31a, there are provided plastically deforming portions 32, 33. The base end portion of the continuous webbing 26 is inserted into a slit 36 formed in the bobbin 31 in the axial direction. When a fixing pin 35 is attached to the above base end portion of the continuous webbing 26, the continuous webbing can be fixed to the bobbin 31.

The plastically deforming portions 32, 33 can be formed from a sheet made of metal such as aluminum or aluminum alloy, or plastic. For example, as illustrated in FIG. 10, four rows of plastically deforming portions 32, 33 are arranged in the axial direction of the bobbin 31 at predetermined intervals, and each row is composed of two plastically deforming portions arranged on the outer circumferential surface of the bobbin 31 in the circumferential direction. That is, eight plastically deforming portions are arranged in total.

Each plastically deforming portion 32, 33 protrudes in the radial direction of the bobbin 31, so that it is arranged perpendicularly to the bobbin 31 in a rib-shape. There are respectively formed inclined surfaces 37, 38 at the end portions of the plastically deforming portions 32, 33. Inclined surfaces 37 of the four plastically deforming portions 32 in the row at the right end and in the row at the left end of the bobbin 31 (these plastically deforming portions 32 will be referred to as the right and the left plastically deforming portion hereinafter in this specification) are formed into tapered-shapes which are tapered in the upper left direction as they come to the ends in FIG. 9. Inclined surfaces 38 of the four plastically deforming portions 33 in the two rows at the center of the bobbin 31 (these plastically deforming portions 33 will be referred to as the central plastically deforming portion hereinafter in this specification) are formed into tapered-shapes which are tapered in the upper right direction as they come to the ends in FIG. 9.

Each plastically deforming portion 32, 33 and the outer circumferential surface of the bobbin 31 are covered with a cylindrical protector 34, the section of which is formed into a substantial C-shape, in which a slit 39 is formed at a position corresponding to the slit portion of the bobbin 31. Both sides of the protector 34, which interpose the slit 39, are bent substantially perpendicularly toward the inside in the radial direction, and these bent portions are engaged with the engaging groove 41 formed in each plastically deforming portion 32, 33.

Accordingly, the inclined surfaces 37, 38 respectively come into contact with the inner circumferential surface of the protector 34 by a predetermined angle. Therefore, the protector 34 makes the plastically deforming portions 32, 33 uniformly support the load caused when the continuous webbing 26 is wound and fastened.

In the case of emergency of a vehicle, the right and the left plastically deforming portion 32 and the central plastically deforming portion 33 receive the load given to the continuous webbing 26 via the protector 34. Since the inclined surfaces 37, 38 come into contact with the inner circumferential surface of the protector 34 by a predetermined angle, a force in the transverse direction (a force in the axial direction of the winding shaft) is applied from the side, on which the inclined surface is formed, as a component force of the winding force. Accordingly, the right and the left plastically deforming portion 32 and the central plastically deforming portion 33 are plastically deformed in the predetermined direction while they are not put on each other.

When the plastically deforming portions 32, 33 are plastically deformed, the actual winding diameter of the bobbin 31 is reduced, so that the shoulder belt 26a is drawn out from the bobbin 31. At this time, kinetic energy of the upper half of the occupant's body is effectively consumed by the deforming resistance of the plastically deforming portions 32, 33 and the winding resistance of the continuous webbing 26.

Accordingly, when the retractor having the bobbin 31 of the fourth embodiment of the present invention is used instead of the retractor 10 having a clamp of the seat belt system of the first embodiment, the kinetic energy absorbing property for the occupant can be enhanced.

The bobbin 31 may be incorporated into the device in accordance with the strokes $L_1, L_2$ of the retractors 10, 51 of the first and the third embodiment described above.

In the retractors 10, 51 having clamps of the first and the third embodiment described above, the upper stay, which is a plastically deforming member, allows the clamp mechanism to further move in the webbing drawing direction after the clamp mechanism has been set at a webbing holding position. The structure of the above upper stay is not limited to the above specific embodiments. Of course, various modifications and alterations may be adopted.

In the retractor 51 having a clamp of the third embodiment, the ribs 55, which are plastically deforming members to be plastically deformed in a direction so as to reduce the webbing winding diameter, are arranged between the outer circumferential surface of the winding shaft 4 and the continuous webbing 26. The structure of the ribs 55 is not limited to the above specific embodiment. Of course, various modifications and alterations may be adopted.

In the fourth embodiment, the plastically deforming portions 32, 33 of the bobbin 31, which are plastically deforming members to be plastically deformed in a direction so as to reduce the webbing winding diameter, are arranged between the outer circumferential surface of the winding shaft 4 and the continuous webbing 26. The structure of the plastically deforming members 32, 33 is not limited to that shown in the fourth embodiment. Of course, various modifications and alterations may be adopted.

What is claimed is:

1. A seat belt sysetm of three-point type in which one end of a continuous webbing is engaged with an anchor plate, a through-tongue is arranged in an intermediate portion of the continuous webbing, the through-tongue is engaged with a buckle vertically arranged at a substantial center of the vehicle body, so that the seat belt system is composed of a shoulder belt to hold the shoulder and breast of an occupant, and a lap belt to fix the waist of the occupant, the seat belt comprising:

a first and second energy absorbing mechanism to absorb an impact acting on the occupant's body by drawing out a predetermined length of the seat belt when a load given to the webbing (26) exceeds a predetermined value, wherein said first energy absorbing mechanism is arranged on the shoulder belt (26a) side and said second energy absorbing mechanism is arranged on the lap belt (26b) side, and the predetermined value of said second energy absorbing mechanism on the lap belt (26b) side is set at a value lower than the predetermined value of said first energy absorbing mechanism on the shoulder belt (26a) side.

2. A seat belt system used for restraining an occupant's body, comprising:

a continuous webbing (26), one end of which is engaged with a retractor (10) and the other end of which is engaged with an anchor plate (14);

a through-tongue (12) arranged in an intermediate portion of the continuous webbing (26), the through-tongue dividing the seat belt system into a first portion arranged between the retractor (10) and the through-tongue (12) and a second portion arranged between the through-tongue (12) and the anchor plate (14);

a first energy absorbing mechanism attached to the retractor (10) operated so that the webbing (26a) in the first portion can be drawn out when a load given to the first portion exceeds a first predetermined value; and a second energy absorbing mechanism operated so that the webbing (26b) in the second portion can be drawn out when a load given to the second portion exceeds a second predetermined value, wherein the second predetermined value is set to be lower than the first predetermined value.

3. A seat belt system according to claim 2, wherein an end of the continuous webbing (26) is engaged with a winding shaft (4) rotatably supported on a retractor base (1) of the retractor (10), and the first energy absorbing mechanism is arranged between the winding shaft (4) and the through-tongue (12).

4. A seat belt system according to claim 3, wherein the first energy absorbing mechanism includes a clamp mechanism (6) capable of holding the webbing (26) drawn out from the winding shaft (4), and a plastically deforming member (19) to allow the clamp mechanism (6) to further move in the webbing drawing direction after the clamp mechanism (6) has been set at the webbing holding position.

5. A seat belt system according to claim 4, wherein the plastically deforming member (19) is arranged between the clamp mechanism (6) and the retractor base (1).

6. A seat belt system according to claim 4, wherein the first energy absorbing mechanism includes a release means (58, 61) for releasing the webbing after the clamp mechanism (6) has been moved to the webbing drawing direction by a predetermined distance.

7. A seat belt system according to claim 6, wherein the first energy absorbing mechanism includes a further energy absorbing mechanism to allow the continuous webbing to be drawn out from the winding shaft (4) after the webbing has been released by the releasing means (58, 61).

8. A seat belt system according to claim 7, wherein the further energy absorbing mechanism is attached to the winding shaft (4).

9. A seat belt system according to claim 7, wherein the further energy absorbing mechanism is arranged between an outer circumferential surface of the winding shaft (4) and the webbing and includes a plastically deforming member (55) capable of being deformed in a direction so that the webbing winding diameter can be reduced.

10. A seat belt system according to claim 3, wherein the first energy absorbing mechanism is attached to the winding shaft (4).

11. A seat belt system according to claim 10, wherein the first energy absorbing mechanism is arranged between an outer circumferential surface of the winding shaft (4) and the webbing (26) and includes a plastically deforming member (32, 33) capable of being deformed in a direction so that the webbing winding diameter can be reduced.

12. A seat belt system according to claim 2, wherein the second energy absorbing mechanism is a fuse belt (5) composed in such a manner that a portion of the continuous webbing (26) is folded and sown.

13. A seat belt system according to claim 12, wherein a caution label (43) is integrally sown to a portion close to the fuse belt (5).

* * * * *